July 20, 1926.
H. H. DOW
1,592,971
PREPARED METALLIC CHLORIDE AND METHOD OF MAKING SAME
Filed Sept. 26, 1925
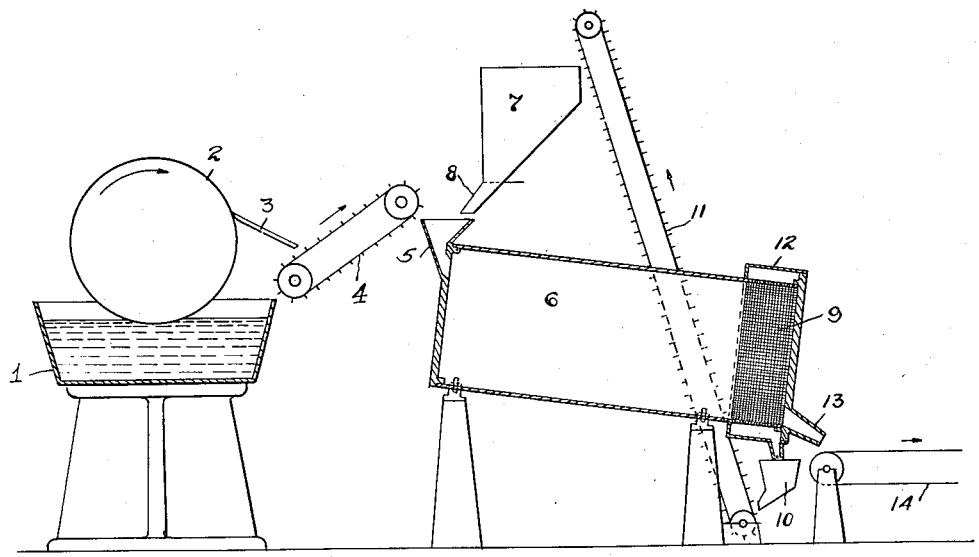
INVENTOR.
Herbert H. Dow.
BY
Fay, Oberlin & Fay
ATTORNEYS.

Patented July 20, 1926.

1,592,971

UNITED STATES PATENT OFFICE.

HERBERT H. DOW, OF MIDLAND, MICHIGAN, ASSIGNOR TO THE DOW CHEMICAL COMPANY, OF MIDLAND, MICHIGAN, A CORPORATION OF MICHIGAN.

PREPARED METALLIC CHLORIDE AND METHOD OF MAKING SAME.

Application filed September 26, 1925. Serial No. 58,802.

While calcium chloride, as well as other hygroscopic chlorides of metals of Group II, and particularly of magnesium, have been marketed for some time past in flaked condition, produced by rotating a drum maintained at a suitable temperature in contact with a body of such chloride in fluid or molten condition, and then scraping off the layer of the material which adheres to the surface of the drum, the particles composing such flaked product tend to coalesce or adhere together in the package, or when piled in storage, so as to form practically a solid body thereof again.

One method for overcoming this objectionable characteristic of such product, as well as the new and improved product resulting from the application of such method, will be found set forth in U. S. Letters Patent No. 1,527,121, dated February 17, 1925, such patented method, briefly stated, consisting in comminuting the fused material and then kiln drying the particles so as superficially to dehydrate the same.

The object of the present invention, like that of the patent just cited, is to produce a metallic chloride of the class referred to above, and particularly of calcium chloride, in a flaked condition such that it will not harden in the packages in time under any ordinary conditions. To the accomplishment, however, of this result, instead of superficially dehydrating the particles by subjecting them to a supplemental drying operation, I have discovered that it is possible to coat the particles of chloride containing water of crystallization, and having a hygroscopic character, with a powder of the same chloride in anhydrous or substantially anhydrous form. Such powder when properly intermingled with the particles will adhere thereto and coat their superficies so as to materially reduce their tendency to cake together in the package. The invention, accordingly, consists of the steps and product hereinafter fully described and particularly pointed out in the claims, the annexed drawing illustrating one typical form of apparatus adapted for the carrying out of such steps, such disclosed apparatus illustrating, however, but one of the various ways in which the principle of the invention may be used.

In said annexed drawing:—

The single figure there appearing illustrates in diagrammatic fashion an apparatus arranged for the carrying out of my improved process or method.

According to the present process, molten calcium chloride having approximately the composition of 71 to 75 per cent. anhydrous calcium chloride, such composition corresponding approximately with the dihydrate form of such chloride ($CaCl_2.2H_2O$), is run into a pan 1 and a cooled roll or rotating drum 2 is disposed so as to dip into the surface of the body of molten material in such pan. This roll picks up the molten chloride in the usual fashion and carries it around until scraped off by a knife 3. Thence the flaked product is carried by a chain conveyor 4 to a chute 5, through which it is dropped into a rotary drum 6. This drum is inclined downwardly away from the end thereof to which the material is thus supplied, so that such material will be caused to pass through the drum and discharge at the lower end thereof. A hopper 7 is mounted above such first mentioned end of the drum with a gate controlled outlet 8 leading to the chute 5, whereby powdered material contained in such hopper may be fed at a desired rate along with the aforesaid flaked product into the interior of the drum.

A section of the drum adjacent such lower end may consist of a cylindrical screen 9 so that as the material passes thereover, any excess of powder included therein will be screened out and discharged into a hopper 10 from which it is carried by means of an elevator 11 back to the aforesaid hopper 7 to be used over again in the manner just indicated. Such screen section of the drum is preferably enclosed entirely about with a hood or casing 12 so as to prevent the escape of dust into the surrounding atmosphere.

The material is finally discharged from the rotary drum through a spout 13 onto an endless belt conveyor 14 whereby it may be conveyed to a storage bin or packing machine.

The rotary drum, it will be understood, acts in effect as a cooling chamber so that the material when it is discharged therefrom will be cooled to approximately normal room temperature. The large bulk of such material will consist of the flaked particles received from the flaking roll 2, just enough of the powdered chloride being intermingled therewith to insure that such flakes are uniformly coated. I find that under the temperature and other conditions obtaining, such powder readily adheres to the flakes and that the latter as they issue from the rotary drum 6 will have their superficies uniformly coated with such powder. Furthermore, by properly gauging the relative amount of the powdered material introduced into said drum, there need be no excess which requires to be screened from the flaked particles, and in such case, the screen 9 may be omitted as a part of the apparatus. Moreover, an excess of the powdered material will do no harm and need be removed only when the finished product is to be put to some use where dusting is objectionable.

The product resulting from the operation of the process consists of particles retaining practically the same shape and size as the flakes heretofore made except as the surfaces of such particles are given a coating as aforesaid. The powder employed for the purpose of such coating will preferably be the anhydrous chloride and this presumably as it comes in contact with the particles and adheres thereto will take up a certain proportion of the water of crystallization in the surface of the flakes but not enough so as to endanger a caking condition.

While only one specific mode of forming the "flaked" particles has been described herein, it will be understood that my improved method or process is generally applicable to such a product whether made in this manner or by granulating the original material in any known way. Thus, the molten chloride may be atomized or the solid cake may be crushed and the resulting particles thereupon intermingled with the powdered chloride in anhydrous form or in form more nearly free from water of crystallization, whereby the superficies of the individual particle, whether flaked or granular, are more completely dehydrated than the interior or main body of such particle, and as a result, the tendency of the particles to agglomerate or cake together in the package is materially reduced.

As hereinbefore indicated, my improved process is equally applicable to the preparation of other metallic chlorides of the class in question, and particularly of magnesium chloride, in the form of non-caking flakes or equivalent particles. Thus, such magnesium chloride normally retains a portion of the water of crystallization. In fact, the manufacture of the anhydrous form requires special pains, but by coating particles consisting of the more hygroscopic form with such anhydrous form, or even with one of the lower hydrated forms, a granular product may be prepared which can be satisfactorily handled in bags or stored without caking under ordinary conditions.

The analysis of the finished product, taken in percentage of anhydrous salt, will vary, depending upon the amount of such anhydrous salt that is caused to adhere to the flaked or otherwise formed particles. However, the finished product should analyze, in the case of calcium chloride, not less than 71 per cent of the anhydrous salt and should preferably exceed 75 per cent.

Other modes of applying the principle of my invention may be employed instead of the one explained, change being made as regards the composition and method herein disclosed, provided the ingredients or steps stated by any of the following claims or the equivalent of such stated ingredients or steps be employed.

I therefore particularly point out and distinctly claim as my invention:—

1. The herein described product comprising particles of a metallic chloride containing water of crystallization and having a hygroscopic character, said particles being intermingled with a powder of such chloride in more nearly dehydrated form.

2. The herein described product comprising particles of a metallic chloride containing water of crystallization and having a hygroscopic character, said particles being intermingled with a powder of such chloride in approximately anhydrous form.

3. The herein described product comprising flake-like particles of a metallic chloride containing water of crystallization and having a hygroscopic character, said particles being coated with a powder of such chloride in more nearly dehydrated form.

4. The herein described product comprising flake-like particles of a metallic chloride containing water of crystallization and having a hygroscopic character, said particles being coated with a powder of such chloride in approximately anhydrous form.

5. The herein described product comprising particles of calcium chloride containing water of crystallization, said particles being intermingled with powdered calcium chloride in more nearly dehydrated form.

6. The herein described product comprising particles of calcium chloride containing water of crystallization, said particles being intermingled with powdered calcium chloride in approximately anhydrous form.

7. The herein described product comprising flake-like particles of calcium chloride containing approximately two molecules of water, said particles being coated with powdered calcium chloride in more nearly dehydrated form.

8. The herein described product comprising flake-like particles of calcium chloride containing approximately two molecules of water, said particles being coated with powdered calcium chloride in approximately anhydrous form.

9. The herein described product comprising particles of calcium chloride containing water of crystallization, said particles being intermingled with powdered calcium chloride in more nearly dehydrated form, the product as a whole analyzing not less than seventy-one (71) per cent of the anhydrous salt.

10. The herein described product comprising flake-like particles of calcium chloride containing approximately two molecules of water, said particles being coated with powdered calicum chloride in more nearly dehydrated form, the product as a whole analyzing not less than seventy-one (71) per cent of the anhydrous salt.

11. The method of treating a comminuted metallic salt containing water of crystallization and normally having a hygroscopic character so as to reduce its tendency to cake in the package, which consists in intermingling the particles of such salt with a powder thereof in more nearly dehydrated form.

12. The method of treating a comminuted metallic salt containing water of crystallization and normally having a hygroscopic character so as to reduce its tendency to cake in the package, which consists in intermingling the particles of such salt with a powder thereof in approximately anhydrous form.

13. In the manufacture of a chloride of the class described, the steps which consists in preparing such chloride in the form of particles, and then intermingling such particles with a powder of such chloride in more nearly dehydrated form.

14. In the manufacture of calcium chloride, the steps which consists in preparing such chloride in the form of particles containing water of crystallization and having a hygroscopic tendency, and then intermingling such particles with powdered calcium chloride in more nearly dehydrated form, whereby the tendency of such particles to cake together in the package is reduced.

15. In the manufacture of calcium chloride, the steps which consist in preparing such chloride in the form of particles containing water of crystallization and having a hygroscopic tendency, and then coating such particles with powdered calcium chloride in approximately anhydrous form, whereby the tendency of such particles to cake together in the package is reduced.

Signed by me this 24th day of September, 1925.

HERBERT H. DOW.